United States Patent
Mukawa et al.

[19]

[11] Patent Number: 5,851,456
[45] Date of Patent: Dec. 22, 1998

[54] METHOD FOR MANUFACTURING A MULTI-LAYER PLASTIC PRODUCT

[75] Inventors: Tatsuhiko Mukawa, Higashi-Kurume; Tatsuya Nakagawa, Matsudo; Yasuo Ezaki, Nitta-machi, all of Japan

[73] Assignees: Fuji Jukogyo Kabushiki Kaisha, Tokyo; Excell Corporation, Chiba-Ken, both of Japan

[21] Appl. No.: 825,416

[22] Filed: Mar. 28, 1997

Related U.S. Application Data

[63] Continuation of Ser. No. 318,015, Oct. 4, 1994, abandoned.

[30] Foreign Application Priority Data

Oct. 4, 1993 [JP] Japan .................................. 5-248301

[51] Int. Cl.$^6$ ...................................................... B29C 45/14
[52] U.S. Cl. ..................... 264/40.1; 264/275; 264/279.1; 264/513; 425/112; 425/149
[58] Field of Search .................................... 264/513, 516, 264/275, 279, 279.1, 40.1; 425/522, 112, 149

[56] References Cited

U.S. PATENT DOCUMENTS

| | | | |
|---|---|---|---|
| 3,991,146 | 11/1976 | Barrie ...................................... | 264/275 |
| 4,314,964 | 2/1982 | Ferrary ..................................... | 264/516 |
| 4,470,785 | 9/1984 | Koorevaar ................................ | 264/513 |
| 4,743,481 | 5/1988 | Quinlan et al. . | |
| 5,169,590 | 12/1992 | Johnson et al. ..................... | 264/279.1 |
| 5,243,933 | 9/1993 | Mukawa . | |
| 5,258,159 | 11/1993 | Freeman et al. ........................ | 264/513 |

FOREIGN PATENT DOCUMENTS

| | | | |
|---|---|---|---|
| 54-72263 | 6/1979 | Japan ..................................... | 264/275 |
| 57-7702 | 1/1982 | Japan ..................................... | 264/513 |
| 3-67056 | 3/1991 | Japan ..................................... | 264/513 |
| 4-189528 | 7/1992 | Japan . | |

OTHER PUBLICATIONS

English Abstract of 4–189,528, Patent Abstracts of Japan M1328, vol. 16, No. 510.

*Primary Examiner*—Catherine Timm
*Attorney, Agent, or Firm*—Skijerven Morrill MacPherson Franklin & Friel LLP; Thomas S. MacDonald

[57] ABSTRACT

A method and apparatus for manufacturing a multi-layer plastic product comprised of a hollow plastic core and an outer plastic layer formed on the core are provided. A mold has a plurality of segments and is provided with a plurality of supply ports arranged in a desired pattern. The mold is assembled with the hollow plastic core located in a mold cavity, and, then, a molten plastic material is supplied into the mold cavity through the plurality of supply ports. Then, the mold is set in its clamped condition to carry out shaping of the molten plastic material into the outer layer having a desired shape. Since the molten plastic material is supplied through a plurality of supply ports, the pressure inside the mold cavity during supply and shaping steps is maintained at a relatively low pressure level, preferably 200 kg/cm$^2$, which is much lower than an ordinary pressure level used in injection molding.

10 Claims, 9 Drawing Sheets

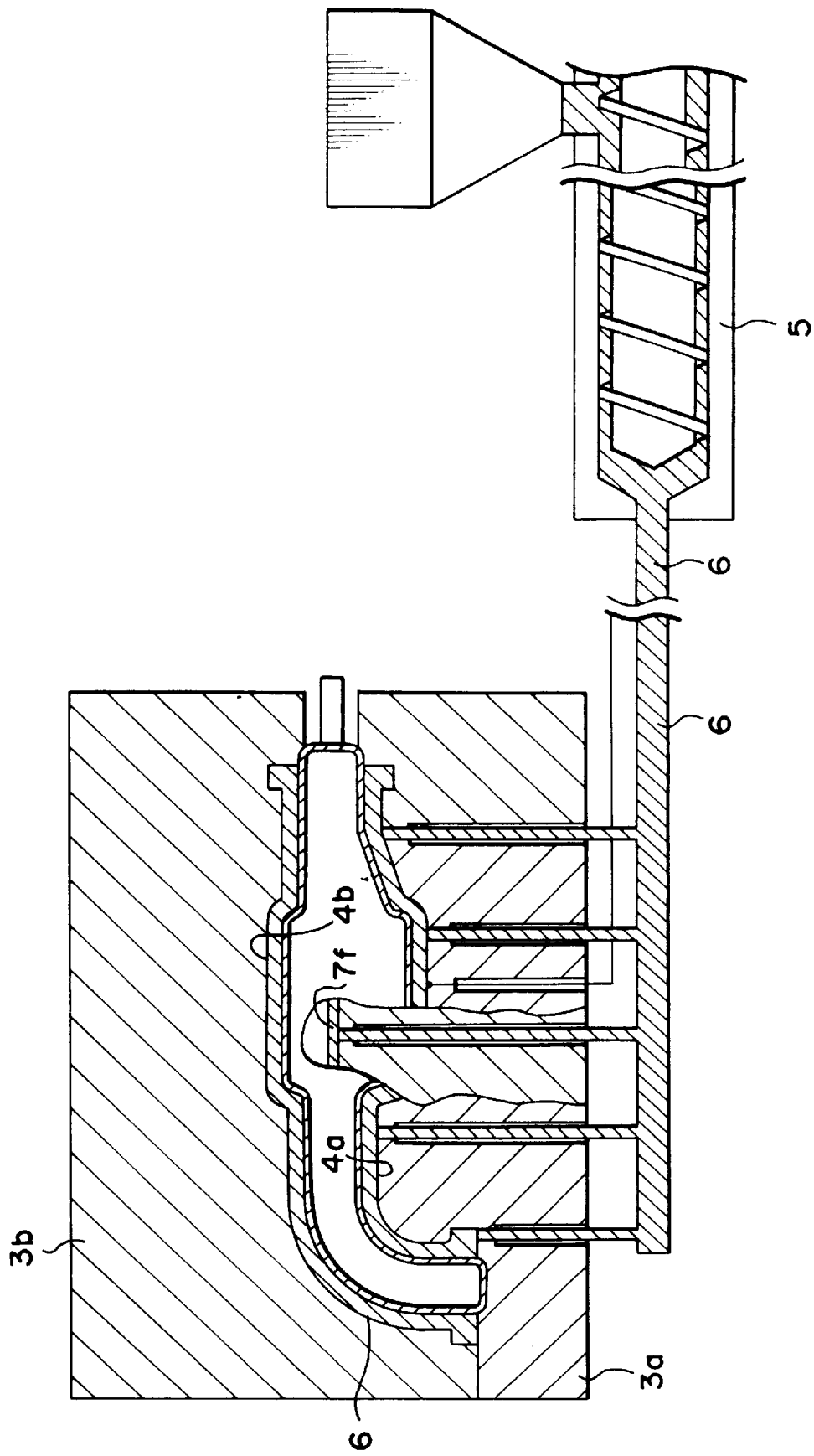

METHOD FOR MANUFACTURING A MULTI-LAYER PLASTIC PRODUCT

This application is a continuation of application Ser. No. 08/318,015, filed Oct. 4, 1994, now abandoned.

BACKGROUND OF THE INVENTION

1. Field of the Invention

This invention relates to a method for manufacturing a multi-layer plastic product, and, in particular, to a method for manufacturing a multi-layer plastic product comprised of a hollow core and an outer layer at a relatively low pressure. More specifically, the present invention is particularly useful in manufacturing a multi-layer plastic product having a relatively complicated structure, such as an intake manifold for use with an internal combustion engine, and various ducts, pipes, and hoses, in particular those having a flange.

2. Description of the Prior Art

Typically, ducts and intake manifolds, for use in an automobile having a flange, have been made of a metal by casting. When manufacturing such a product by casting, a core made of sand or the like is placed in position in a casting mold and then a molten metal is poured into the mold. In this case, however, the sand core must be removed from the mold upon cooling of the molten metal, which is cumbersome, and, in addition, since it is made of a metal, the resulting product is heavy. Since it is vital to make components of an automobile as light as possible to provide an increased fuel efficiency, it is disadvantageous to make an intake manifold or other ducting products in an automobile from a metal. Under the circumstances, various proposals have been made to manufacture ducting products, such as air-intake related products, from a plastic material, such as a thermoplastic resin.

For example, in the case of an air-intake manifold, several methods have already been developed based on injection molding of a thermoplastic resin. According to a core melting method, after placing a core made from a low melting point metal alloy by injection molding in position in an injection mold, a molten resin material is injected into the injection mold, and, then, the metal alloy is caused to melt by electromagnetic induction to thereby remove the molten metal alloy from the injection mold.

According to a two component fusing method, two components are first molded from a resin material by injection molding and then these two components are integrated together by fusing, such as vibration fusing. According to a rotating core method, while defining a curved shape of a product with a predetermined radius, a resin material is injected into an injection mold in which a core is provided rotatably, and, then, the core is rotated for removal from the injection mold upon completion of injection molding. There has also been proposed a method using blow molding, in which case, a blow-molded hollow product and an injection-molded flange are integrated by thermal fusing or a blow-molded hollow product is placed in an injection mold for forming a flange by injection molding integrally with the blow-molded hollow product.

For example, a method for manufacturing a multi-layer plastic product comprised of a hollow core and an outer layer formed on the hollow core is described in the U.S. Pat. No. 4,743,481 issued to Quinlan et al. on May 10, 1988 and also described in the U.S. Pat. No. 5,243,933 issued to Mukawa on Sep. 14, 1993. Another similar method is also described in the U.S. patent application Ser. No. 07/800,330 which corresponds to Japanese patent application Ser. No. 2-317985, which, in turn, has been laid open as Japanese Patent Laid-open Pub. No. 4-189528 on Jul. 8, 1992.

However, in the above-described prior art methods, a relatively high pressure is required in molding or forming an outer shell of a multi-layer plastic product. In particular, problems could arise if the shape of a product to be molded is rather complicated. That is, in such a case, difficulty could be encountered in providing a molten plastic material uniformly throughout the entire shape. For example, there is a chance that a flange is not formed completely.

SUMMARY OF THE INVENTION

In accordance with a first aspect of the present invention, there is provided a method for manufacturing a multi-layer plastic product, such as an intake manifold, which comprises a hollow plastic core comprised of a first plastic material into a desired shape and an outer layer integrally formed on an outer surface of the hollow plastic core from a second plastic material.

The hollow plastic core is preferably formed from a first plastic material, such as a first thermoplastic resin, by blow molding. The hollow plastic core thus formed is then placed in position in a mold cavity which is defined by assembling two or more mold segments, whereby a gap is provided between the hollow plastic core and the inner surface of the mold cavity. Then, a second plastic material, such as a second thermoplastic resin, is supplied into the gap in a molten condition under pressure. Typically, the second plastic material is heated to set in its molten condition. Then, the second plastic material thus supplied is shaped either by the pressure of the second plastic material being supplied under pressure or by bringing the mold segments into a clamped condition. In this case, the shaping is carried out at a relatively low pressure of 200 kg/cm$^2$ or less, which is much smaller than a normal pressure range used in injection molding. Then, the second plastic material is hardened by cooling to have it integrated with the hollow plastic core to thereby provide a completed multi-layer plastic product.

In a mold for use in the above-described method, a plurality of supply ports are provided so that the molten second plastic material is supplied into the mold cavity through the plurality of supply ports substantially at the same time. In a modified embodiment, at least one of the plurality of supply ports is a film-shaped supply port whose supply port is the form of an elongated slot rather than an ordinary circular hole so that the molten second plastic material is supplied in the form of a relatively thin film.

In a preferred embodiment, the shaping of the outer layer is effected at a pressure in a range between 10 and 180 kg/cm$^2$. According to the study made by the present inventors, it has been found that if the shaping pressure applied to the hollow plastic core is lower, the hollow plastic core can retain its shape and also does not undesirably shift in position during the shaping step. However, if the shaping pressure is less than 10 kg/cm$^2$, then there is a chance that the molten second plastic material is not supplied sufficiently and also it may take too much time. As a result, the shaping pressure must be approximately equal to or larger than 10 kg/cm$^2$.

On the other hand, if the molten second plastic material is supplied into the mold cavity under higher pressures, it can be supplied with a reduced time period. However, since the core is made of a plastic material and hollow, if the pressure of the second plastic material being supplied is excessively high in pressure, then the hollow plastic core could be locally deformed or undesirably shifted in position within the mold cavity during the supply of the second plastic material. Similarly, if the shaping pressure applied to the hollow plastic core either by the second plastic material being supplied or by clamping the mold is excessively high, then the hollow plastic core could be locally deformed or undesirably shifted in position within the mold cavity during shaping. For this reason, the pressure of the second plastic material being supplied into the cavity and the shaping pressure must be approximately equal to or less than 200 kg/cm$^2$, or preferably 180 kg/cm$^2$.

Now, when supplying the molten second plastic material into the mold cavity through a plurality of supply ports provided in the mold, if a surface area of a portion of the outer layer formed by the second plastic material supplied through a supply port (hereinafter, referred to as the "surface area covered by a supply port") is excessively large, then the supply pressure for supplying the second plastic material must be increased so that undesired local deformation or shifting in position of the hollow plastic core could result. Thus, it is desirable to control the supply of the second plastic material through each of the plurality of supply ports such that the surface area covered by a supply port does not exceed approximately 400 cm$^2$.

In some cases, there may be a case in which the hollow plastic core is locally deformed undesirably during supply of the second plastic material or shaping depending on the thickness and/or shape of the hollow plastic core. For example, if the hollow plastic core is too thin, then it may be undesirably deformed locally by the pressure of the second plastic material which is being supplied under pressure or the shaping pressure. Moreover, if the hollow plastic core has a substantially large flat section, then such a large flat section could be also undesirably deformed during the supply of the second plastic material or shaping. Such disadvantages can be avoided by maintaining the gas (typically, air) pressure inside the hollow plastic core approximately equal to or less than 15 kg/cm$^2$ at least during the supply of the second plastic material and/or shaping of the outer layer. Although it is true that the gas pressure inside the hollow plastic core can withstand higher external pressures if it is set at higher levels, such a higher gas pressure inside the hollow plastic core could be detrimental to the hollow plastic core itself since such a higher gas pressure could cause deformation or rupture of the hollow plastic core itself. As a result, it is preferable to apply a pressurized gas, such as air, into the interior of the hollow plastic core to keep the gas pressure inside the core approximately equal to or less than 15 kg/cm$^2$, or more preferably 10 kg/cm$^2$. It is true, however, that it is not necessary to supply such pressurized gas into the interior of the hollow plastic core as long as the core has a sufficient rigidity or shape holding capability because of its thickness and/or material itself. It is to be noted that liquid can be used in place of gas in this respect.

In accordance with another aspect of the present invention, there is provided an apparatus for manufacturing a multi-layer plastic product, such as an intake manifold. The apparatus comprises a segmented mold which can be assembled to define a mold cavity having a desired shape and which is provided with a plurality of supply ports arranged in a desired pattern. The apparatus also comprises supplying means for supplying a molten plastic material to each of the plurality of supply ports of the segmented mold. The apparatus also comprises a control unit for controlling the supplying means such that the molten plastic material is supplied in the mold cavity so as not to exceed a predetermined pressure level, preferably 200 kg/cm$^2$ or less, more preferably in a range between 10 and 200 kg/cm$^2$. The controller also controls the clamping of the segmented mold such that the shaping pressure applied by the clamping operation of the segmented mold does not exceed a predetermined pressure level, preferably 200 kg/cm$^2$ or less, more preferably in a range between 10 and 180 kg/cm$^2$.

Preferably, a pressure detector for detecting the pressure in the mold cavity is provided in the segmented mold and it is operatively coupled to the control unit. With this structure, the pressure of the molten plastic material supplied into the mold cavity can be monitored and controlled so as not to exceed undesired limits.

Moreover, in accordance with the present invention, it is so structured that the amount of molten plastic material supplied by each of the plurality of supply ports is so controlled that the molten plastic material supplied through any one of the plurality of supply ports does not form a portion of the outer layer which has a surface area exceeding 400 cm$^2$. This constraint may be satisfied by arranging the plurality of supply ports in a desired pattern depending on the shape of the hollow plastic core or positively controlling the supply of the molten plastic material through each of the supply ports. In the latter case, the cross sectional area of each of the supply ports may be appropriately determined or the supply of the molten plastic material to each of the supply ports may be positively controlled by individual supply units and/or control units.

It is therefore a primary object of the present invention to obviate the above-described disadvantages of the prior art and to provide an improved method and apparatus for manufacturing a multi-layer plastic product.

Another object of the present invention is to provide a method and apparatus for manufacturing a multi-layer plastic product comprised of a hollow plastic core and an outer plastic layer formed on the hollow plastic core, such as an air-intake manifold for use with an internal combustion engine.

A further object of the present invention is to provide a method and apparatus for manufacturing a multi-layer plastic product which does not require a high pressure in molding or shaping an outer layer.

A still further object of the present invention is to provide an improved method and apparatus for manufacturing a multi-layer plastic product complicated in shape efficiently.

Other objects, advantages and novel features of the present invention will become apparent from the following detailed description of the invention when considered in conjunction with the accompanying drawings.

BRIEF DESCRIPTION OF THE DRAWINGS

FIG. 1b is a schematic illustration showing in fragmentary cross sectional view part of the intake manifold core shown in FIG. 1a;

FIG. 1c is a schematic illustration showing in front view the intake manifold core shown in FIG. 1a:

FIG. 2b is a schematic illustration showing in front view the intake manifold shown in FIG. 2a;

FIG. 2c is a schematic illustration showing in fragmentary cross sectional view part of the intake manifold shown in FIG. 2a;

FIG. 4 is a schematic illustration showing a second embodiment which is a modification of the first embodiment shown in FIGS. 3a–c by providing at least one film-shaped supply port for supplying a molten plastic material into the gap between the intake manifold core and the mold;

DESCRIPTION OF THE PREFERRED EMBODIMENTS

Figure 1A:
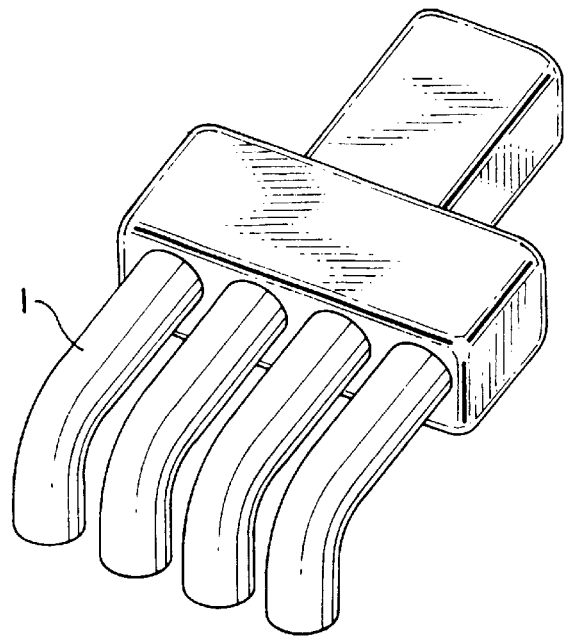
FIG. 1a is a schematic illustration showing in perspective view an intake manifold core formed by blow molding for use in the present invention.
Figure 1B:
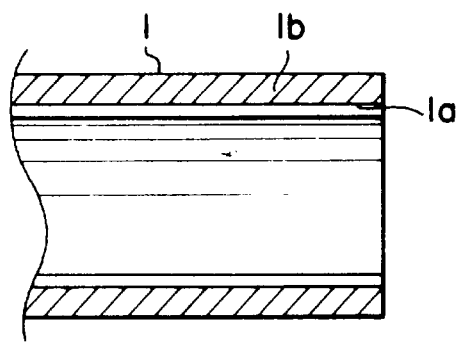
Figure 1C:
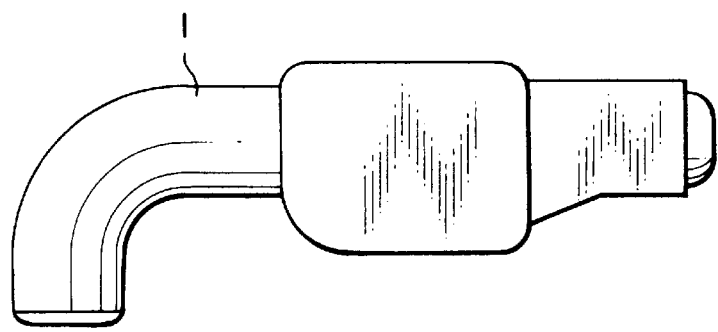

Referring now to FIGS. 1a and 1c, there is schematically shown in perspective view and front view, respectively, an intake manifold core 1 as an example of a hollow plastic product for use in the present invention. The intake manifold core 1 is preferably formed by blow molding, though it may also be formed by any other desired method. As shown in FIG. 1b, in the case of illustrated intake manifold core 1, it has a two-layer structure including a first layer 1a and a second layer 1b. Preferably, the first layer 1a is formed from a non-reinforced plastic material capable of providing an inner smooth surface of the core 1 and the second layer 1b is formed from a reinforced plastic material capable of providing a desired mechanical strength. The intake manifold core 1 having such a two-layer structure can be advantageously formed from a two-layer parison by blow molding. When formed by blow molding, typically use is made of thermoplastic resin materials.

Figure 2A:
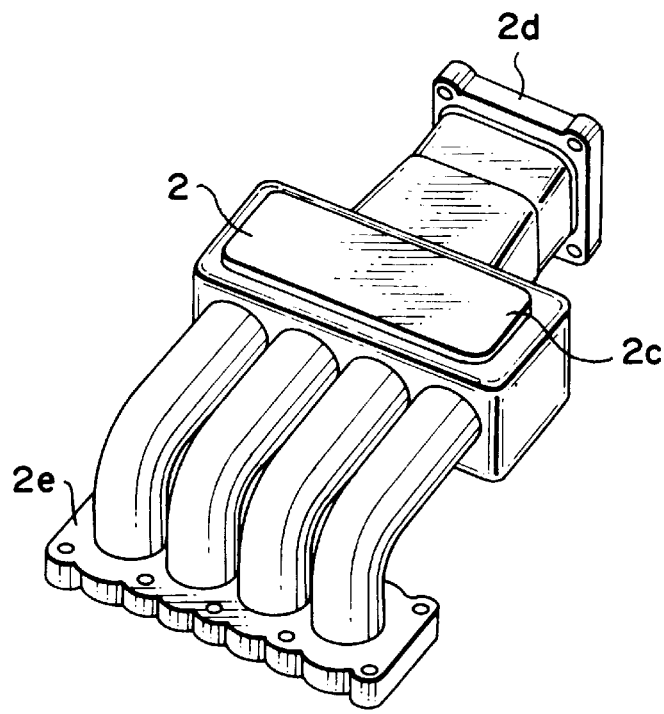
FIG. 2a is a schematic illustration showing in perspective view an intake manifold manufactured by forming an outer layer on the intake manifold core shown in FIGS. 1a–c according to an embodiment of the present invention.
Figure 2B:
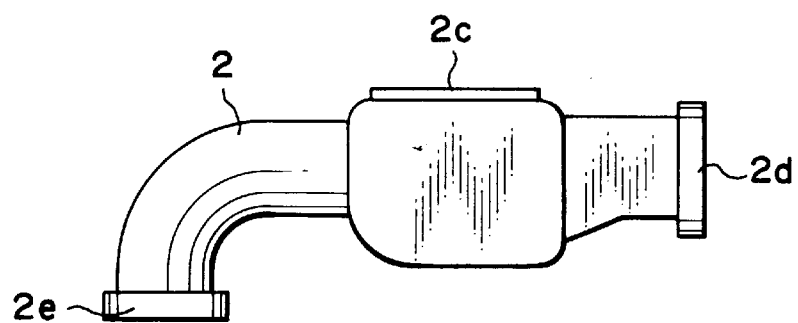
Figure 2C:
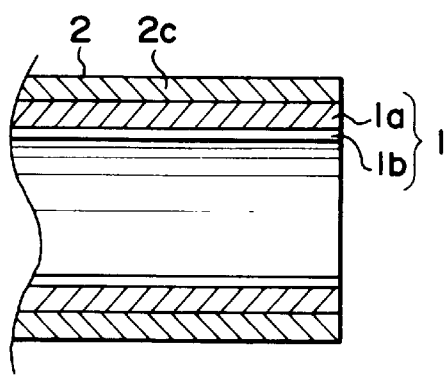

FIGS. 2a and 2b illustrate in perspective view and front view, respectively, an intake manifold, as an example of a multi-layer plastic product of the present invention, which is obtained by forming an outer layer or shell 2 of a plastic material on the outer surface of the intake manifold core 1 shown in FIGS. 1a–c in accordance with the present invention. As shown in FIG. 2c, the outer layer 2 is formed on the entire outer surface of the core 1. In addition, as shown in FIGS. 2a and 2b, the outer layer 2 also defines flanges 2d and 2e at opposite ends of the core 1. It is to be noted that, in FIGS. 2a and 2b, the outer layer or shell 2 covering the core 1 is shown only partly as an outer layer portion 2c. The outer layer 2 is preferably formed from a reinforced plastic material so as to provide a desired mechanical strength to the core 1 and also to flanges 2d and 2e.

Now, with reference to FIGS. 3a through 3c, an embodiment of the present invention for manufacturing an intake manifold as an example of a multi-layer plastic product of the present invention will be described in detail. It is to be noted that the embodiment shown in FIGS. 3a through 3c uses a segmented mold 3 provided with a plurality of supply ports for supplying a molten plastic material into a mold cavity and that this embodiment is the case in which shaping of an outer layer or shell is effected by a clamping operation of the segmented mold.

Figure 3A:
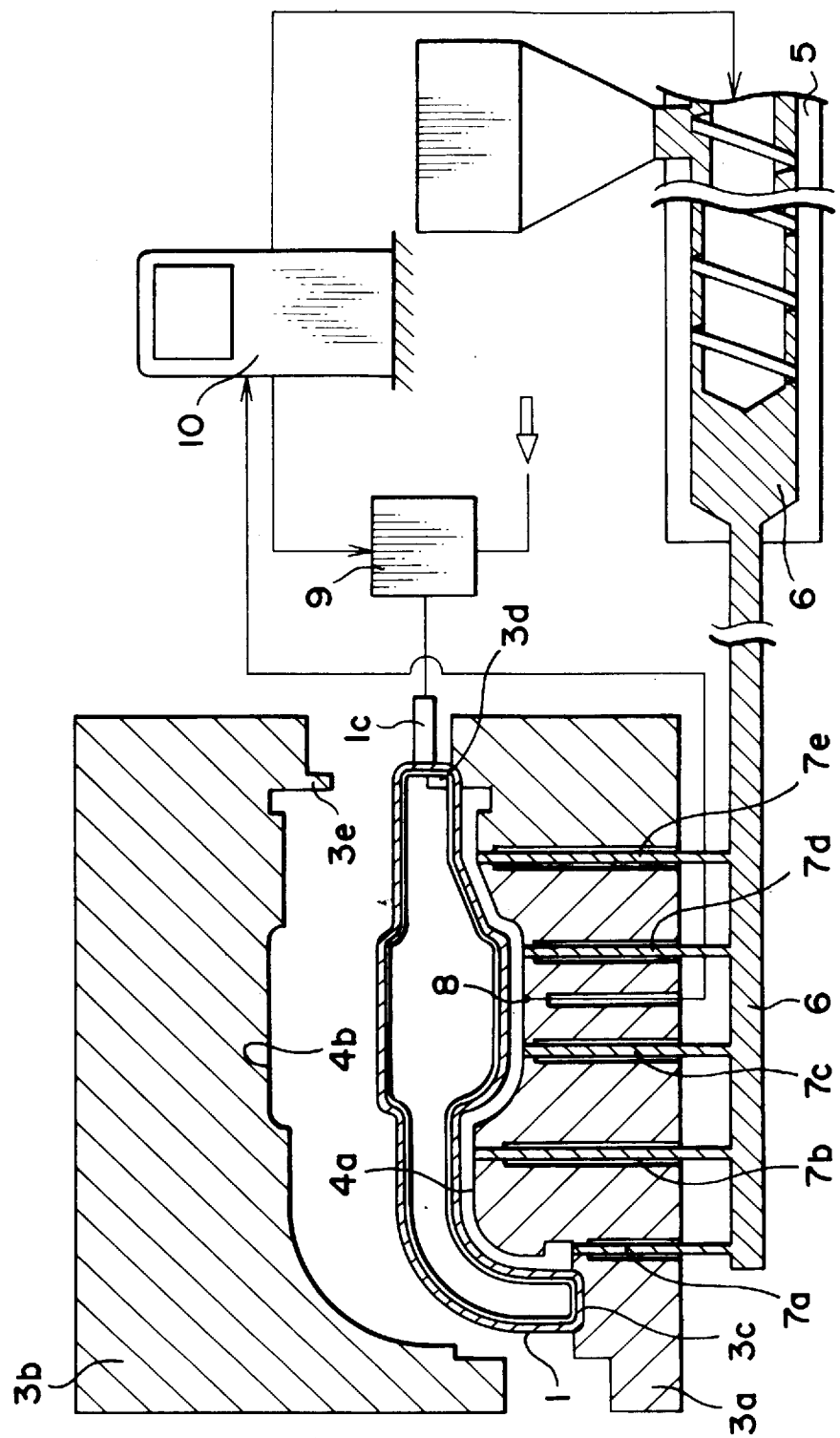
FIG. 3a is a schematic illustration showing a step of placing a blow-molded intake manifold core in position in a cavity of a lower mold half according to a first embodiment of the present invention.

First, referring to FIG. 3a, the segmented mold 3 is a two-part mold including a lower mold half 3a and an upper mold half 3b. In this particular embodiment, it is so structured that the upper mold half 3b may be moved up and down relative to the stationary lower mold half 3a. However, it is to be noted that both of the lower and upper mold halves 3a and 3b may be movable relative to each other or the lower mold half 3a may be moved up and down relative to the stationary upper mold half 3b. In addition, the mold halves 3a and 3b may also be oriented in any desired direction as long as they may be brought into and out of engagement as desired.

The lower mold half 3a has a lower cavity surface 4a in commensurate with the shape of the lower half of a product to be molded and the upper mold half 3b also has an upper cavity surface 4b in commensurate with the shape of the upper half of the product. Thus, when the lower and upper mold halves are brought into engagement, a mold cavity is defined therebetween. In the illustrated embodiment, the upper mold half 3b may be brought into engagement with the lower mold half 3a in two stages. That is, the lower mold half 3b may be brought into a temporary mating condition with the lower mold half 3a in the first stage of engagement to define a mold cavity, and a molten plastic material may be supplied into the mold cavity in this condition. Then, the lower mold half 3b may be brought into a clamped condition with the lower mold half 3a in the second stage of engagement so as to effect shaping of the molten plastic material supplied into the mold cavity. Thus, the lower and upper mold halves 3a and 3b are so structured that they may be brought into a clamped condition in a stepwise fashion.

Of importance, the lower mold half 3a is provided with a plurality of supply ports or passages 7a–7e spaced apart from one another along the length of the lower cavity surface 4a. Each of the supply ports 7a–7e is in communication with a molten plastic supply unit 5 which supplies a molten plastic material 6 under pressure. Typically, the molten plastic material 6 is heated to a predetermined temperature to be set in its molten state. Although all of supply ports 7a–7e are commonly connected to the supply unit 5 in the illustrated embodiment, a separate supply unit may be provided for each of the supply ports 7a–7e or a flow rate adjusting unit may be provided for each of supply ports 7a–7e so as to allow to regulate the flow rate of molten plastic material 6 for each of supply ports 7a–7e independently in alternative embodiments. It should also be noted that the flow rate of molten plastic material 6 may also be regulated individually in the structure shown in FIG. 3a by setting a flow rate condition, such as a cross sectional area, for each of supply ports 7a–7e individually.

The lower mold half 3a is also provided with a pressure sensor 8 for sensing the pressure inside the mold cavity and the pressure sensor 8 is operatively coupled to a control unit 10, such as a computer system, which is also in operatively coupled to the supply unit 5. Also operatively coupled to the control unit 10 is a pressurized gas source 9 which can supply a pressurized gas through a connector 1c under the control of the control unit 10. The molten plastic material supply unit 5 supplies the molten plastic material 6 under the control of the control unit 10. Thus, the amount of molten plastic material 6 to be supplied, the pressure of molten plastic material 6 being supplied, the timing of supply of molten plastic material 6 or the like are all controlled by the control unit 10.

As shown in FIG. 3a, with the upper mold half 3b located at its upper position away from the lower mold half 3a, a blow-molded intake manifold core (hollow plastic core) 1 is placed in position on the lower mold half 3a. In the illustrated embodiment, the intake manifold core 1 is secured in position with its left-hand end in contact with a left-hand seat 3c of the lower mold half 3a and its right-hand end in contact with a right-hand seat 3d of the lower mold half 3a. In the illustrated embodiment, the upper mold half 3b is provided with a holding projection 3e which projects downward from the right-hand end of its upper cavity surface 4b and the holding projection 3e comes to hold the right-hand end of the intake manifold core 1 to securely keep the core 1 in position inside a mold cavity 11 when the upper mold half 3b is brought into the temporary mating condition as shown in FIG. 3b.

Figure 3B:
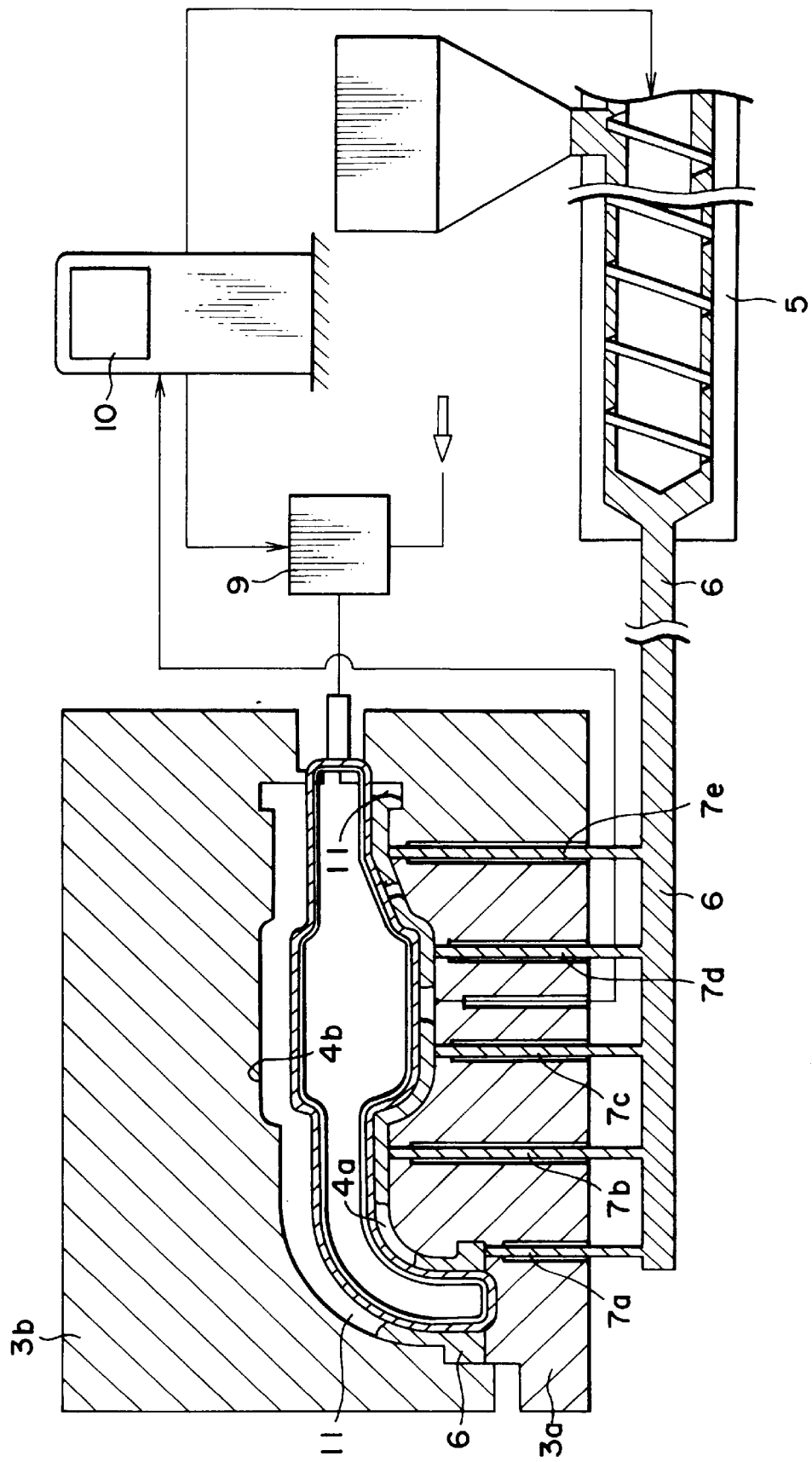
FIG. 3b is a schematic illustration showing a step of bringing an upper mold half in a temporary mating relation with the lower mold half for supplying a molten plastic material into a gap between the intake manifold and the mold according to the first embodiment of the present invention.

After placing the intake manifold core 1 in position as shown in FIG. 3a, the upper mold half 3b is moved downward and thus closer to the lower mold half 3a to bring the upper and lower mold halves 3a and 3b in a temporary mating or clamped condition as shown in FIG. 3b. This is the condition which corresponds to a first stage of engagement between the lower and upper mold halves 3a and 3b to define a mold cavity 11 by the lower and upper cavity surfaces 4a and 4b and in which the air inside the mold cavity 11 may escape but the molten plastic material supplied into the mold cavity 11 cannot escape between the mating contact between the lower and upper mold halves 3a and 3b. In this condition, a gap is defined between the intake manifold core 1 and the lower and upper cavity surfaces 4a and 4b and this is the gap in which the molten plastic material 6 is to be supplied.

Under the condition, a predetermined amount of the molten plastic material 6 is supplied under pressure into the mold cavity 11 or the gap between the intake manifold core 1 inside the mold cavity 11 and the lower and upper cavity surfaces 4a and 4b through supply ports or passages 7a–7e from the molten plastic material supply unit 5 under the control of the control unit 10. In this case, such parameters as the amount of molten plastic material 6 to be supplied into the mold cavity 11, the supply pressure under which the molten plastic material 6 is supplied into the mold cavity 11, the supply rate at which the molten plastic material 6 is supplied into the mold cavity 11, timing of supply of molten plastic material 6 and the like are all controlled by a program stored in the control unit 10. At least some of these parameters can be controlled independently for at least some of the supply ports 7a–7e, for example, by providing an independent control mechanism for each of at least some of the supply ports 7a–7e. For example, for a supply port located at or near the location where a flange or the like is to be formed, it may be so structured or its parameters may be so controlled to supply a larger amount of molten plastic material 6.

After supplying a predetermined amount of molten plastic material 6 into the mold cavity 11 under the control of the control unit 11, the supply of molten plastic material 6 is terminated and then the upper mold half 3b is again moved downward until it is brought into a complete clamped condition with the lower mold half 3a. This corresponds to a second stage of engagement between the lower and upper mold halves 3a and 3b as shown in FIG. 3c. During this step, the molten plastic material 6 inside the mold cavity 11 is shaped into a desired shape defined by the cavity surfaces 4a and 4b since the shaping pressure is applied to the molten plastic material 6 inside the mold cavity when the lower and upper mold halves 3a and 3b are brought closer together from their temporary clamped condition to their complete clamped condition.

During this shaping step, since the shaping pressure is applied not only to the molten plastic material 6 inside the mold cavity 11, but also to the intake manifold core 1, there is a chance that the intake manifold core 1 is undesirably shifted in position or deformed at least locally. It has been found by the present inventors that these disadvantages can be obviated by controlling the shaping pressure not to exceed a predetermined level, which is preferably 200 $kg/cm^2$. Depending on various parameters such as the level of shaping pressure and the shape or thickness of intake manifold core 1, it may be so structured to fill the interior of intake manifold core 1 with a fluid, such as pressurized gas or liquid, so as to positively prevent the intake manifold core 1 from being deformed during this shaping step.

Since the pressure sensor 8 is provided in the lower mold half 3a for detecting the pressure inside the mold cavity 11, the shaping pressure can be monitored and controlled by the control unit 10. That is, this shaping operation can be carried out such that the shaping pressure does not exceed a predetermined upper limit, such as 200 $kg/cm^2$.

Figure 3C:
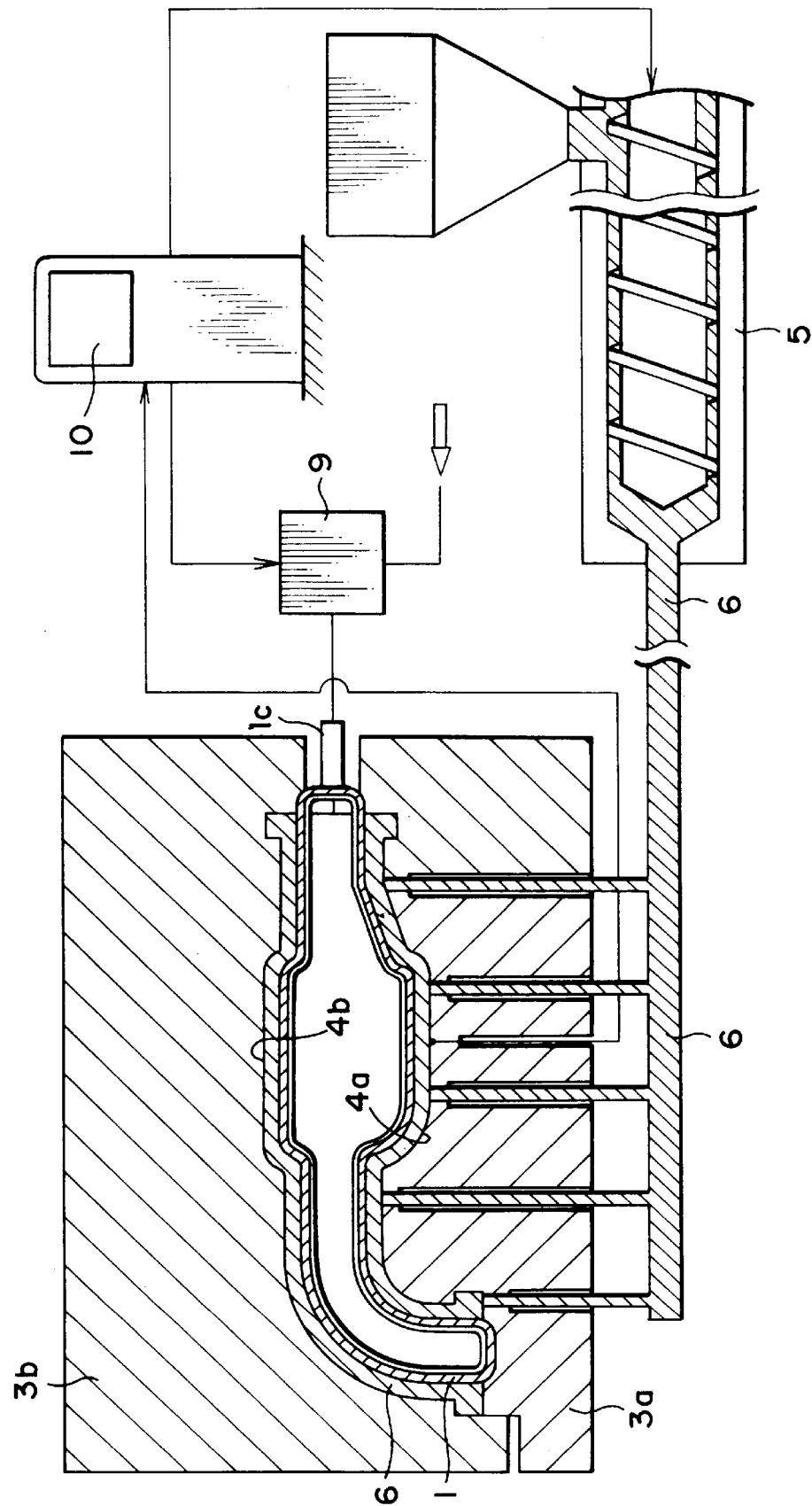
FIG. 3c is a schematic illustration showing a step of bringing the upper and lower mold halves in a complete mating relation to thereby carry out shaping of an outer layer to be formed on the intake manifold core from the molten plastic material according to the first embodiment of the present invention.

As shown in FIG. 3c, pressurized air can be supplied into the interior of intake manifold core 1 from the pressurized gas source 9 through the connector 1c which establishes a fluidic communication between the interior of intake manifold core 1 and the pressurized gas source 9. Thus, the gas pressure inside the intake manifold core 1 can be maintained at a desired level under the control of the control unit 10. Although it is true that the intake manifold core 1 can be prevented from being deformed by the shaping pressure by maintaining the pressure inside the intake manifold core 1 at an increased level, the intake manifold core 1 itself may be deformed or ruptured if the pressure inside the intake manifold core 1 is increased excessively. Thus, it has been found by the present inventors that the pressure inside the intake manifold core 1 should be maintained at a level equal to or less than 15 $kg/cm^2$. It should, however, be noted that there may be cases in which there is no need to supply a pressurized gas or liquid into the interior of the intake manifold core 1 as long as the intake manifold core 1 has a sufficient shape retaining capability, for example, because of its thickness and the material used.

Upon completion of the shaping step as described above, the molten plastic material 6 thus shaped is cooled so that an outer layer 2 having a desired shape is integrally formed on the outer surface of the intake manifold core 1. In order to expedite this cooling step, a cooling passage system may be provided at least in one of the lower and upper mold halves 3a and 3b and a coolant, such as water, may be run through the cooling passage system to carry heat away from the molten plastic material 6 to allow to have it hardened expeditiously. Thereafter, the upper mold half 3b is moved upward to its original retracted position so that the resulting multi-layered intake manifold comprised of the intake manifold core 1 and its outer layer can be removed from the mold 3.

In the above-described embodiment shown in FIGS. 3a–3c, use has been made of a mold having a plurality of supply ports or passages 7a–7e which are arranged in a predetermined pattern. In accordance with a feature of the present invention, it is important to provide such a plurality of supply ports 7 in a mold 3 because the amount and flow rate of molten plastic material 6 supplied by each of supply ports 7 can be reduced. This allows to decrease the overall supply pressure of molten plastic material 6. Besides, since more than one supply port 7 is provided, the molten plastic material 6 can be supplied more expeditiously while maintaining the supply pressure at a reduced level. Since the supply pressure of molten plastic material 6 can be decreased, the intake manifold core 1 can be prevented from being shifted in position or deformed by the incoming molten plastic material 6.

Furthermore, two or more supply ports 7 can be located closer together at a location where the outer layer 2 to be formed requires a relatively large amount of molten plastic material 6 because a flange or the like is to be formed there. As a result, upon completion of the step of supplying molten plastic material 6 into the mold cavity 11, the molten plastic material 6 thus supplied is distributed uniformly across the mold cavity 11. This is advantageous since it allows to reduce the shaping pressure to be applied to the molten plastic material 6 thus supplied in carrying out the shaping step. It has been found by the present inventors that a surface area covered by an amount of molten plastic material 6 supplied by any one of the plurality of supply ports 7 should be controlled so as not to exceed 400 cm$^2$. This is the surface area of a portion of outer layer 2 which is formed by an amount of molten plastic material 6 supplied by a single supply port 7. If this limit is exceeded, then there is a chance that the intake manifold core 2 could be shifted in position or deformed during the supply of molten plastic material 6 into the mold cavity 11. Besides, there is also a chance that a higher shaping pressure could be needed because of non-uniform distribution of molten plastic material 6 across the mold cavity 11 upon completion of the supply step of molten plastic material 6, which, in turn, could lead to shifting in position or deformation of intake manifold core 1 during the following shaping step.

The supply ports 7 may have any desired shape, though they are typically circular in cross section. However, if the intake manifold core 1 has a locally weak section, such as a relatively large flat section, such a weak section is more likely to be deformed while the molten plastic material 6 is supplied into the mold cavity 11 under pressure. In order to alleviate such a problem, use may be advantageously made of a film type supply port which is in the form of an elongated slot for supplying the molten plastic film 6 in the form of a relatively wide thin film. While a circular supply port applies a supply pressure at a point on the intake manifold core 1, a film type supply port applies a supply pressure along a line on the intake manifold core 1, and, thus, there is less impact on the intake manifold core 1 when the molten plastic material 6 is supplied through such a film type supply port. Moreover, the use of such a film type supply port is also advantageous in distributing the molten plastic material 6 more uniformly when supplied into the mold cavity 11. Thus, such a film type supply port should be used as much as possible depending on applications.

FIG. 4 illustrates an embodiment in which a film type supply port 7f is used as one of a plurality of supply ports 7. The remaining supply ports in this embodiment are all of the common type so that they may be circular in shape. It can be understood from FIG. 4 that the film type supply port 7f is provided at a location where a relatively large flat section is present in the intake manifold core 1.

Figure 5:
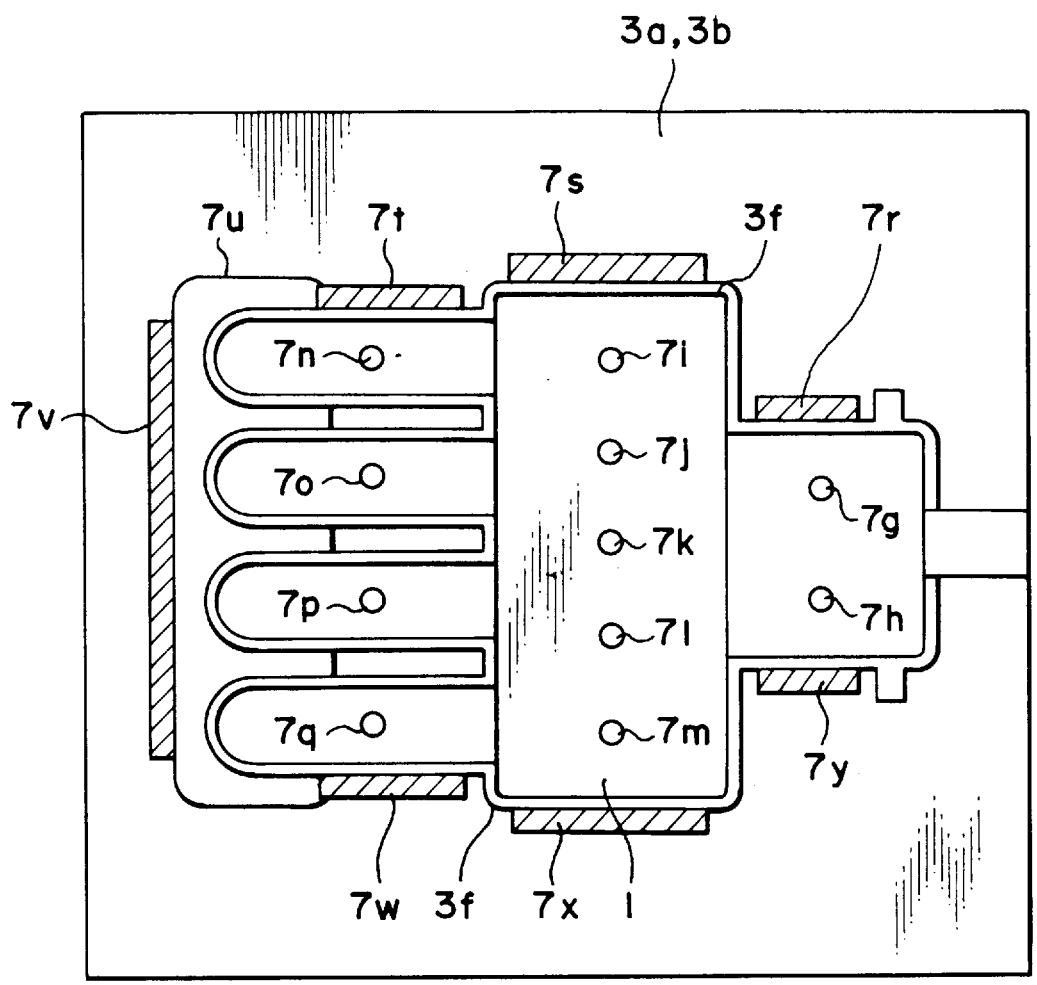
FIG. 5 is a schematic illustration showing an example of an arrangement of a plurality of supply ports to be provided on a mold for supplying a molten plastic material into a mold cavity.

FIG. 5 illustrates an example of an arrangement of a plurality of supply ports 7 for a specific intake manifold core 1. That is, a lower or upper mold half 3a or 3b is formed with a mold cavity half 3f in which the intake manifold core 1 is located with a gap between the mold cavity half 3f and the intake manifold core 1. The gap is filled with a molten plastic material to form an outer layer on the intake manifold core 1. The mold half 3a or 3b is provided with a first plurality of circular supply ports 7g–7q and a second plurality of film type supply ports 7r–7y. In this particular example, circular supply ports 7g–7q are arranged spaced apart from one another at those locations which correspond to either the top or bottom of the intake manifold core 1 and film type supply ports 7r–7y are arranged along the sides of the intake manifold core It is to be noted that although all of the supply ports 7 are provided in either one of the lower and upper mold halves 3a and 3b in the above-described embodiments, the present invention should not be limited to such specific examples and they may be provided in both of or all of the segments of a mold, if desired.

Figure 6:
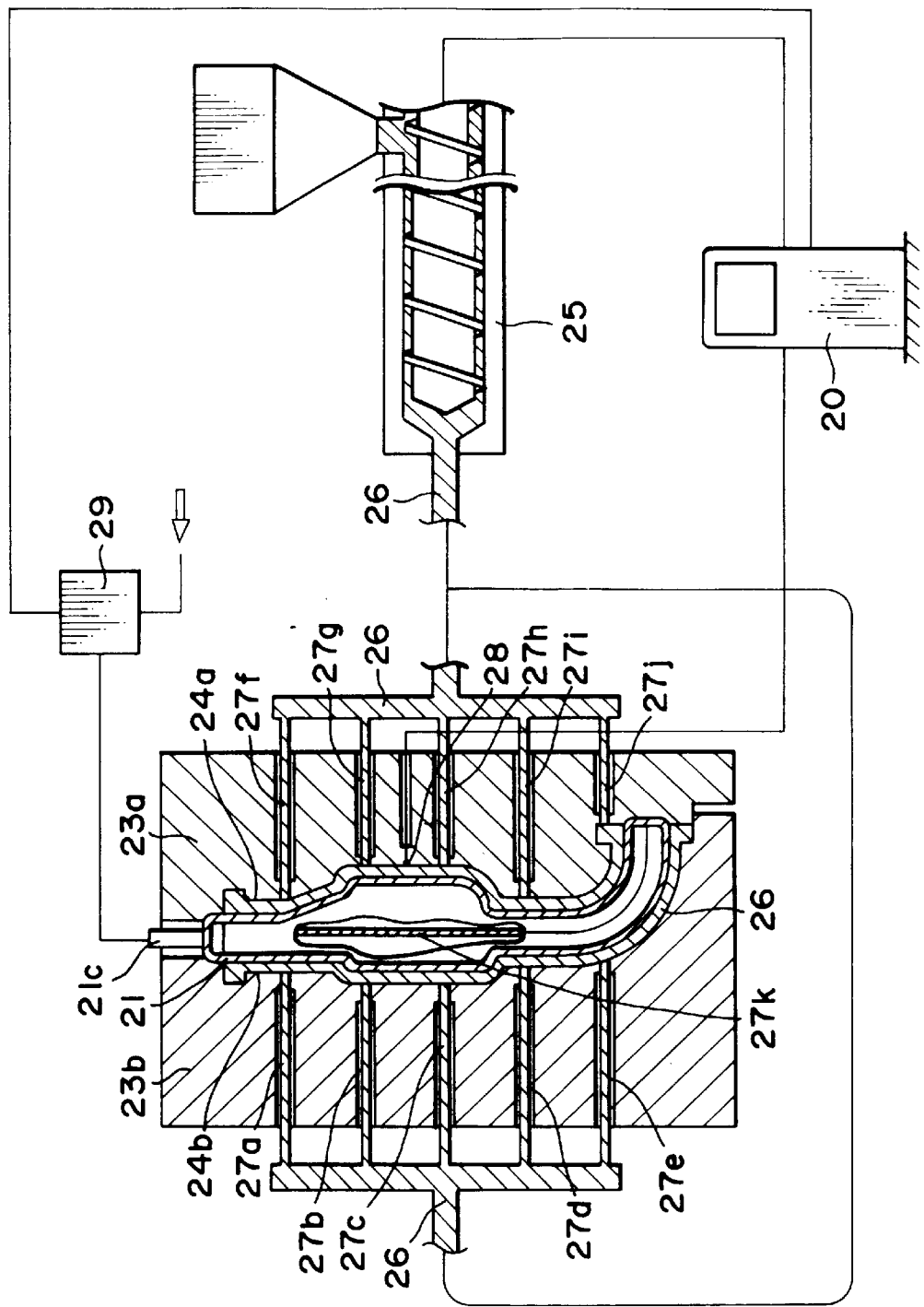
FIG. 6 is a schematic illustration showing a third embodiment of the present invention in which shaping of an outer layer to be formed on an intake manifold is effected by the pressure for supplying a molten plastic material into the mold cavity rather than a clamping force of the mold.

FIG. 6 illustrates another embodiment of the present invention, in which the shaping of an outer layer on a hollow plastic core is effected by the supply pressure of a molten plastic material. As shown in FIG. 6, use is made of a two-part mold having a right-hand mold half 23a and a left-hand mold half 23b. The left-hand mold half 23b is provided with a plurality of supply ports 27a–27e and the right-hand mold half 23b is also provided with a plurality of supply ports 27f–27j. All of these supply ports 27a–27j are in fluidic communication with a supply unit 25 for supplying a molten plastic material 26 under pressure. The supply unit 25 is operatively coupled to a control unit 20, such as a computer system, so that the operation of the supply unit 25 is carried out in accordance with a program stored in the control unit 10.

A pressure sensor 28 is also provided in the right-hand mold half 23a and it is also operatively coupled to the control unit 20. Thus, the pressure inside a mold cavity defined between the mold halves 23a and 23b can be monitored by the pressure sensor 28. A pressurized gas source 29 is also provided for supplying a pressurized gas under the control of the control unit 20.

In this embodiment, the left and right mold halves 23a and 23b are brought into a clamped condition with a blow-molded intake manifold core 21 as a hollow plastic core located in position inside a mold cavity defined by cavity surfaces 24a and 24b of respective mold halves 23a and 23b. Since the mold is set in its clamped condition, a gap defined between the intake manifold core 21 and the cavity surfaces 24a and 24b corresponds to an outer layer to be formed on the intake manifold core 21. Under the condition, the molten plastic material 26 is supplied into the gap under pressure by the supply unit 25 and at the same time the shaping of the thus supplied molten plastic material 26 into a desired shape is effected by the supply pressure of molten plastic material 26. As a result, the shaping pressure and the supply pressure are the same in this embodiment since the shaping into an outer layer is effected by the supply pressure of the molten plastic material 26 supplied.

As shown in FIG. 6, the pressurized gas source 29 is in fluidic communication with the interior of the intake manifold core 21 through a connector 21c so that the pressure inside the intake manifold core 21 may be monitored and maintained at a predetermined level under the control of the control unit 20, if desired. Use may of course be made of liquid rather than pressurized gas for maintaining the pressure inside the intake manifold core 21 at a predetermined level. Since the pressure sensor 28 is provided in the mold 23 for detecting the pressure of the molten plastic material 26 supplied into the mold cavity or the gap between the intake manifold core 21 and the cavity surfaces 24*a* and 24*b*, the supply of molten plastic material 26 and thus shaping of an outer layer can be controlled such that the shaping pressure does not exceed a predetermined level.

In the embodiment shown in FIG. 6, an additional supply port is also provided at a mating surface between the mold halves 23*a* and 23*b*. That is, a film type supply port 27*k* extending vertically over a length is provided at a mating surface between the right-hand and left-hand mold halves 23*a* and 23*b* and this supply port 27*k* is also in communication with the supply unit 25. Thus, the molten plastic material 26 is also supplied into the mold cavity through this film type supply port 27*k*. The remaining supply ports 27*a*–27*j* are all of the common type and thus may be circular in shape.

In this embodiment, upon completion of supply of molten plastic material 26 into the mold cavity, the shaping of the molten plastic material thus supplied has also been completed. Thus, upon completion of the supply of molten plastic material 26, the resulting multi-layer plastic product, or intake manifold in this example, is allowed to cool to have the molten plastic material 26 defining the outer layer to harden. For this purpose, a coolant passage system may be provided in the mold 23 for providing positive cooling. Thereafter, the mold half is opened to remove the resulting multi-layer plastic product, or intake manifold in this embodiment is removed from the mold 23.

Similarly with the previously described embodiments shown in FIGS. 3–5, the intake manifold core 21 may be undesirably deformed or shifted in position during the supply of molten plastic material 26. In order to avoid this problem, use must be made of a plurality of supply ports so as to allow to reduce the overall supply pressure of molten plastic material 26. In addition, the plurality of supply ports should be arranged strategically depending on the shape of the intake manifold core 21 and also the shape of an outer layer to be formed thereon. In addition, use should be made of at least one film type supply port in addition to common supply ports.

Similarly with the previously described embodiments, the shaping pressure, also supply pressure in this embodiment, should be controlled so as not to exceed a predetermined level, such as 200 kg/cm$^2$, or more preferably in a range between 10 and 180 kg/cm$^2$. In addition, a surface area of a portion of an outer layer formed by an amount of molten plastic material 26 supplied by a single supply port should also be controlled not to exceed a predetermined level, such as 400 cm$^2$. Besides, if the pressurized air is to be supplied into the interior of the intake manifold core 21 during the shaping or supply of molten plastic material 26, then the pressure inside the intake manifold core 21 should be controlled so as not to exceed a predetermined level, such as 15 kg/cm$^2$.

Figure 7A:
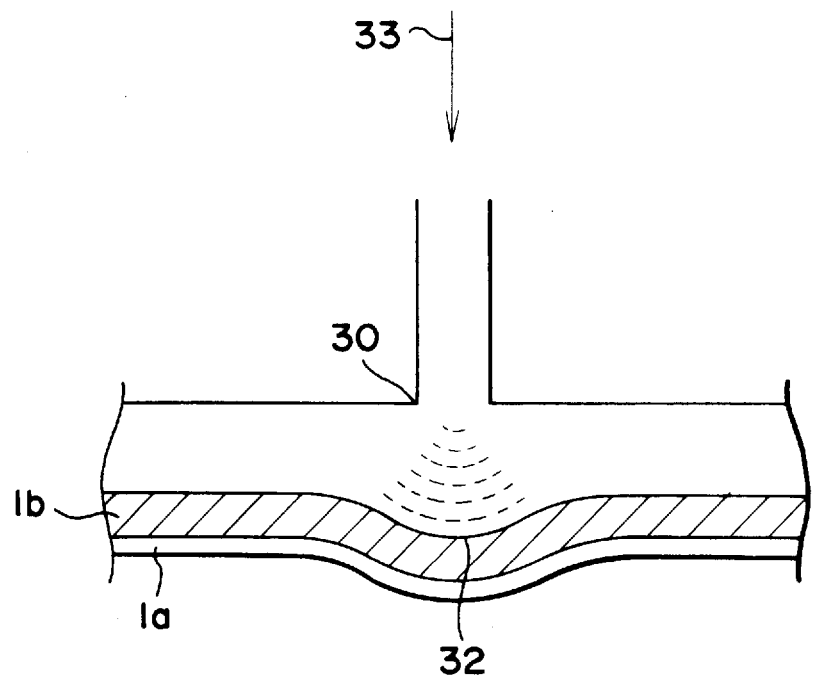
FIGS. 7a and 7b are schematic illustrations useful for explaining how a blow-molded hollow plastic core, such as an intake manifold core, can be effected by the molten plastic material which is being supplied into the mold cavity.
Figure 7B:
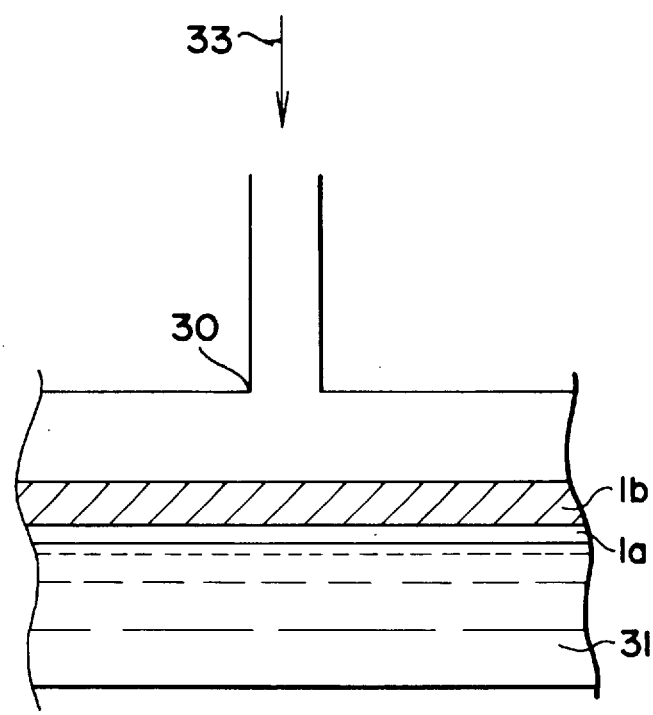

Now, FIG. 7*a* illustrates a prior art example in which a hollow plastic core 1 is locally deformed at 32 because of a relatively high pressure of a molten plastic material supplied into the mold cavity through a supply port 30 in a direction indicated by arrow 33. On the other hand, FIG. 7*b* illustrates an example of the present invention in which no deformation occurs in the hollow plastic core 1 even if a molten plastic material is supplied into the mold cavity in the direction indicated by arrow 33 through a supply port 30. In the example shown in FIG. 7*b*, the interior of the hollow plastic core 1 is filled with a pressurized gas 31.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A method for manufacturing a multi-layer thermoplastic product using a mold comprising a plurality of mold segments, said mold defining a mold cavity having a desired shape when assembled and including a plurality of supply ports in communication with said mold cavity, comprising the steps of:

(1) assembling said plurality of mold segments to thereby define said mold cavity with a blow-molded hollow plastic core located in position inside said mold cavity, said core being held in position away from a surface of said mold defining said mold cavity excepting at a plurality of core end portions, each of which portions being in engagement with a corresponding, predetermined portion of said mold;

(2) supplying a molten thermoplastic material under pressure into an open gap between said core and the surface of said mold defining said mold cavity through said plurality of supply ports;

(3) setting a pressure of said molten thermoplastic material supplied into said gap at a predetermined shaping pressure, which is approximately equal to or less than 200 kg/cm$^2$, to form an outer layer having a desired shape on said core to thereby form a multi-layer plastic product; and during step (2), regulating an amount of said molten thermoplastic material supplied by any one of said plurality of supply ports such that a surface area of a portion of said outer layer formed by said molten thermoplastic material and supplied by a single port does not exceed approximately 400 cm$^2$.

2. A method according to claim 1, further comprising a step of cooling said multi-layer thermoplastic product after step (3).

3. A method according to claim 1, wherein said predetermined shaping pressure is approximately in a range between 10 kg/cm$^2$ and 180 kg/cm$^2$.

4. A method according to claim 1, wherein at least during step (3), a pressurized gas or liquid is supplied into an interior of said core to maintain a pressure inside said core at a predetermined level.

5. A method according to claim 4, wherein said predetermined level is 15 kg/cm$^2$.

6. A method according to claim 1, wherein said steps (2) and (3) are carried out at the same time, whereby shaping of said outer layer is carried out by the supply pressure of said molten thermoplastic material.

7. A method according to claim 1, wherein said mold is set in a temporary clamped condition when assembled at step (1) and then said mold is set in a complete clamped condition during step (3), whereby shaping of said outer layer is carried out by a pressure produced when said mold is set in the complete clamped condition.

8. A method for manufacturing a multi-layer thermoplastic product having a mold comprising a plurality of mold segments, said mold defining a mold cavity having a desired shape when assembled and including a plurality of supply ports in communication with said mold cavity, comprising the steps of:

(1) assembling said plurality of mold segments to thereby define said mold cavity with a blow-molded hollow plastic core located in position inside said mold cavity;

(2) supplying a molten thermoplastic material under pressure into an open gap between said core and a surface of said mold defining said cavity through said plurality of supply ports;

(3) setting a pressure of said molten thermoplastic material supplied into said gap at a shaping pressure which is approximately equal to or less than 200 kg/cm² to form an outer layer having a desired shape on said core to thereby form a multi-layer thermoplastic product, while monitoring the pressure of said molten thermoplastic material supplied into the gap and controlling the pressure so as not to exceed said shaping pressure; and during step (2), regulating an amount of said molten thermoplastic material supplied by any one of said plurality of supply ports such that a surface area of a portion of said outer layer formed by said molten thermoplastic material and supplied by a single port does not exceed approximately 400 cm².

9. The method of claim 8 wherein the shaping pressure is 180 kg/cm².

10. The method of claim 8 wherein the shaping pressure of the molten thermoplastic material supplied into the gap is in a range between 10 kg/cm² and 180 kg/cm².

* * * * *